United States Patent
Carbonaro et al.

(10) Patent No.: US 9,677,480 B2
(45) Date of Patent: Jun. 13, 2017

(54) HIGH DIAGNOSABILITY, QUALITY MANAGED-COMPLIANT INTEGRATED CIRCUIT FOR IMPLEMENTING ASIL B-COMPLIANT AUTOMOTIVE SAFETY-RELATED FUNCTIONS

(71) Applicants: Magneti Marelli S.p.A., Corbetta (IT); Exida Development S.r.l., Colleretto Giacosa (IT)

(72) Inventors: Piero Carbonaro, Turin (IT); Giovanni Dallara, Ivera (IT); Alessandro Fusari, Cremona (IT); Alberto Pezzoli, Turin (IT); Francesco Traversi, San Mauro Torinese (IT); Loris Lambertini, Crespellano (IT)

(73) Assignee: Magneti Marelli S.p.A, Corbetta (IT)

( * ) Notice: Subject to any disclaimer, the term of this patent is extended or adjusted under 35 U.S.C. 154(b) by 393 days.

(21) Appl. No.: 14/446,466

(22) Filed: Jul. 30, 2014

(65) Prior Publication Data
US 2015/0057908 A1 Feb. 26, 2015

(30) Foreign Application Priority Data

Jul. 30, 2013 (IT) .............................. TO2013A0646

(51) Int. Cl.
*B60W 50/00* (2006.01)
*G07C 5/00* (2006.01)
(Continued)

(52) U.S. Cl.
CPC ............ *F02D 29/02* (2013.01); *B60W 50/02* (2013.01); *F02D 41/22* (2013.01); *F02D 41/26* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,230,094 B1 | 5/2001 | Ohashi et al. | |
| 6,523,525 B1 * | 2/2003 | Hawkins | ................. F01P 11/16 |
| | | | 123/396 |

(Continued)

FOREIGN PATENT DOCUMENTS

| | | |
|---|---|---|
| DE | 196 05 606 A1 | 8/1997 |
| DE | 10 2010 000 397 A1 | 9/2010 |
| DE | 10 2010 062 476 A1 | 6/2012 |

OTHER PUBLICATIONS

Apr. 30, 2014 Italian Search Report for Italian Patent Application No. TO20130646.

*Primary Examiner* — Yonel Beaulieu
(74) *Attorney, Agent, or Firm* — Howard & Howard Attorneys PLLC (57) ABSTRACT

An automotive internal combustion engine electronic control unit for performing safety-related functions with a predetermined automotive safety integrity level, including: a microcontroller and an integrated circuit distinct from and communicating with the microcontroller. The microcontroller performs one or more safety-related functions with the same automotive safety integrity level as required to the automotive engine electronic control unit. The integrated circuit performs one or more safety-related functions with an automotive safety integrity level that is lower than that of the microcontroller. The integrated circuit performs, for each performed safety-related function, a corresponding diagnosis function for detecting failures in the performance of the safety-related function. The microcontroller performs, for each performed diagnosis function, a corresponding monitoring function for monitoring performance of the corre- (Continued)

sponding diagnosis function by the integrated circuit to detect failures that may compromise the diagnostic capability of the diagnosis function.

11 Claims, 5 Drawing Sheets

(51) Int. Cl.

| | | |
|---|---|---|
| *G07C 5/08* | (2006.01) | |
| *B60W 50/02* | (2012.01) | |
| *F02D 29/02* | (2006.01) | |
| *F02D 41/22* | (2006.01) | |
| *F02D 41/26* | (2006.01) | |
| *B60W 50/029* | (2012.01) | |
| *B60W 50/04* | (2006.01) | |

(52) U.S. Cl.
CPC ..... *G07C 5/0808* (2013.01); *B60W 2050/021* (2013.01); *B60W 2050/0292* (2013.01); *B60W 2050/041* (2013.01); *G05B 2219/24021* (2013.01); *G05B 2219/24044* (2013.01); *G05B 2219/24199* (2013.01); *G05B 2219/2637* (2013.01); *G05B 2219/33104* (2013.01); *G05B 2219/33273* (2013.01)

(56) References Cited

U.S. PATENT DOCUMENTS

| | | | |
|---|---|---|---|
| 2002/0193935 | A1 | 12/2002 | Hashimoto et al. |
| 2009/0030587 | A1 | 1/2009 | Yonezawa et al. |
| 2010/0036558 | A1 | 2/2010 | Murakami |
| 2012/0280644 | A1* | 11/2012 | Lind ................. H02P 29/027 318/476 |
| 2014/0163820 | A1* | 6/2014 | Nettelmann ........... B60G 11/27 701/37 |

\* cited by examiner

HIGH DIAGNOSABILITY, QUALITY MANAGED-COMPLIANT INTEGRATED CIRCUIT FOR IMPLEMENTING ASIL B-COMPLIANT AUTOMOTIVE SAFETY-RELATED FUNCTIONS

CROSS-REFERENCE TO RELATED APPLICATION

This application is based upon and claims priority to Italian Patent Application No. TO 2013A000646, filed on Jul. 30, 2013.

BACKGROUND OF THE INVENTION

1. Field of the Invention

The present invention relates, generally, automotive safety-related functions and, more specifically, to a high diagnosability, quality managed-compliant integrated circuit for implementing Automotive Safety Integrity Level B (ASIL B)-compliant automotive safety-related functions.

2. Description of the Related Art

Safety is one of the main concerns in the automotive industry. As such, on-vehicle integration of electric and electronic systems requires development processes and safety content. Moreover, there is an expectation of being able to provide proof that all reasonable safety goals have been met.

New technologies based on functions distributed in various electronic control units, which are typically developed by different suppliers, increase the complexity, software content, mechatronic implementation, and the risks of system and hardware failures.

Increasing the integration of electric and electronic apparatuses (including programmable devices and electromechanical components) in automotive systems has led to the introduction of international standard ISO 26262, which is addressed by functional safety standard IEC 61508 for electric/electronic systems in industry.

ISO 26262 provides the process and product requirements for lessening the effects of system and hardware failures, and deals with functional safety concepts applied to the automotive field, while pursuing the absence of unacceptable risks due to hazards caused by undesired behaviour of the systems.

ISO 26262 defines four Automotive Safety Integrity Levels (ASIL) and specifics risks and the needs for reducing risk. ASIL can take on four different values for safety-related functions. These values are indicated with letters, from the lowest indicated by the letter D, which is the most critical level in terms of safety integrity, up to the highest level indicated by the letter A, which is the minimum safety integrity level. However, ASIL may also take on the value QM (Quality Managed), which is assigned to non-safety-related functions.

The hazard and risk assessment set forth by ISO 26262, and the reference document "Standardized E-Gas-Monitoring Concept for Engine Controls of Otto and Diesel Engines", version 5.0, published by the German Association of the Automotive Industry or VDA (Verband der Automobilindustrie), provide that implementation of automotive safety-related functions involved in managing the supply of torque by an internal combustion engine have ASIL B.

Designing, developing and manufacturing integrated circuits that implement ASIL B-compliant automotive safety-related functions require significant resources. Thus, there remains a need in the art to define a more affordable solution that allows the ASIL B safety-related functions set forth in ISO 26262 and IEC 61508 to be met with integrated circuits which are designed, developed, and manufactured with Quality Managed criteria.

SUMMARY OF THE INVENTION

The present invention overcomes the disadvantages in the related art in an automotive internal combustion engine electronic control unit for performing safety-related functions with a predetermined automotive safety integrity level; wherein the automotive electronic control unit includes a microcontroller and an integrated circuit distinct from and communicating with the microcontroller. The microcontroller is designed to perform one or more safety-related functions with the same automotive safety integrity level as required to the automotive electronic control unit. The integrated circuit is designed to perform one or more safety-related functions with an automotive safety integrity level lower than that of the microcontroller. The integrated circuit is further designed to perform, for each performed safety-related function, a corresponding diagnosis function designed to detect failures in performance of the safety-related function. The microcontroller is designed to perform, for each performed diagnosis function, a corresponding monitoring function designed to monitor the performance of the corresponding diagnosis function by the integrated circuit to detect failures that may compromise the diagnostic capability of the diagnosis function.

BRIEF DESCRIPTION OF THE DRAWINGS

Other objects, includes, and advantages of the present invention will be readily appreciated as the same becomes better understood after reading the subsequent description taken in connection with the accompanying drawing wherein.

DETAILED DESCRIPTION OF THE INVENTION

The present invention will now be described in detail with reference to the accompanying Figures to allow a person having ordinary skill in the art to make and use it. Various modifications to the embodiments described will be immediately apparent to skilled persons and the generic principles described may be applied to other embodiments and applications without departing from the scope of protection of the present invention, as defined in the appended claims. Therefore, the present invention is not be considered limited to the embodiments described and illustrated, rather is to be given the broadest scope of protection conforming with the principles and characteristics herein described and claimed.

Figure 1:
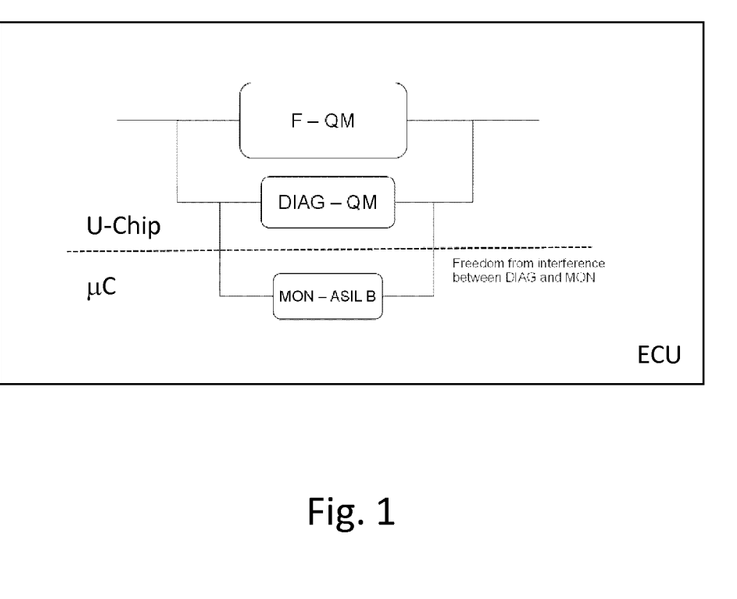
FIG. 1 is a principle block diagram which shows how an automotive safety-related function, indicated by F, may be implemented so as to be ASIL B compliant with implementation thereof according to Quality Managed standards, in which a diagnosis function DIAG may be developed according to Quality Managed standards and in which a monitoring function MON may be developed according to standard ASIL B; the implementation of function F and of function DIAG is allocated to an integrated circuit U-Chip; the implementation of function MON is instead allocated to a microcontroller μC.

FIG. 1 shows a principle block diagram illustrating how an automotive safety-related function, indicated by F, may be implemented so as to be ASIL B compliant with an integrated circuit developed according to Quality Managed standards.

The integrated circuit, hereinafter referred to as a "U-Chip" (Umbrella-Chip), is dedicated (among other things) to performing F, and arranged in an automotive internal combustion engine electronic control unit, indicated by ECU. The U-CHIP is an electronic component distinct from and communicating with the microcontroller, indicated by μC, of the ECU, and is designed to perform Quality Managed-compliant functions, which, therefore, fail to reach the ASIL B level required for the implementation of F.

As discussed below and shown in FIG. 1, reference made to F is valid and repeatable for each F performed by U-Chip to be performed by the ECU in compliance with ASIL B requirements.

With reference to FIG. 1, in order to ensure that an F is implemented by the ECU with ASIL B, in addition to function F, the U-Chip also performs a diagnosis function, indicated by DIAG, designed to detect failures that may jeopardize the proper performance of F. Because DIAG is performed by U-Chip, it will be appreciated that DIAG is performed with the same QM ASIL with which F is performed.

A monitoring function, indicated by MON and designed to monitor the operability of DIAG and, in particular, to detect failures that may compromise the effectiveness of the diagnostic capability of DIAG, is instead performed by μC of ECU, which is designed to perform functions with an ASIL B and is exempt from any functional interferences resulting from failures in the performance of DIAG or F.

Figure 2:
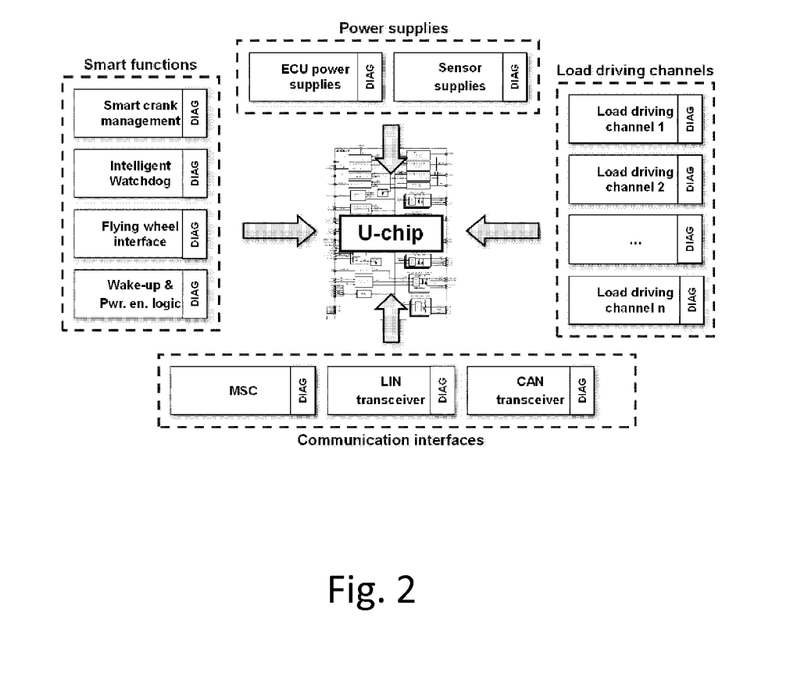
FIG. 2 shows a block diagram of the functions performed by an integrated circuit.

FIG. 2 shows a block diagram of the functions F performed by U-Chip, which include: intelligent functions such as smart crank management, intelligent watchdog, flying wheel interface, and wake-up and power enable logic; power supplies such as ECU power supplies and sensor power supplies; communication interfaces such as MSC (Micro Second Channel) interface, LIN (Local Interconnect Network) transceiver, and CAN (Controller Area Network) transceiver; and load driving channels.

Figure 3:
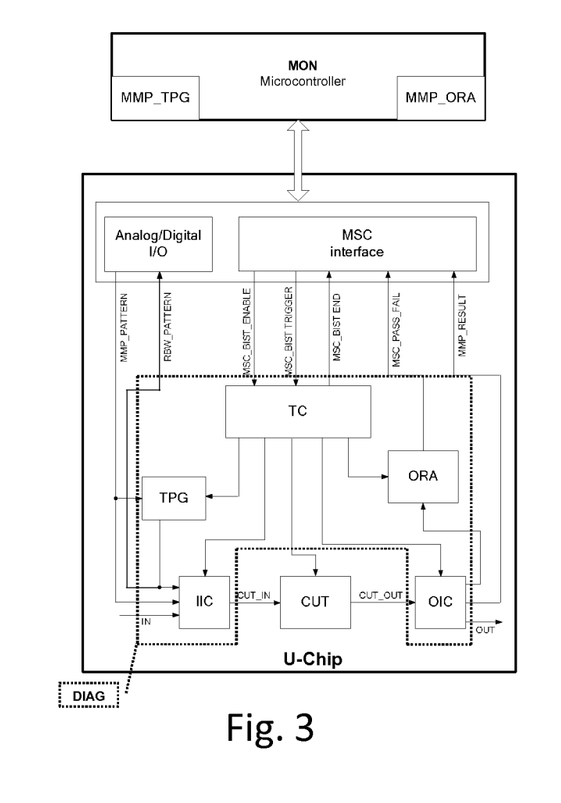
FIG. 3 shows a block diagram of a generic diagnostic function DIAG implemented in the integrated circuit U-Chip of FIG. 1.

FIG. 3 shows a block diagram of how F and DIAG are implemented in the U-Chip, in which: TC is a Test Controller designed to enable and synchronize the performance of DIAG; CUT is a Circuit Under Test designed to implement function F that DIAG is to monitor; TPG is a Test Pattern Generator designed to test correct operation of CUT; ORA is an Output Response Analyzer designed to compare the test results, and in particular to compare the output of CUT with an expected output and provide an indication of test success or test failure; IIC is an Input Isolation Circuit designed to connect the input of CUT to TPG when DIAG is to be performed; and OIC is an Output Isolation Circuit designed to connect the output of CUT to ORA when DIAG is to be performed.

Generally, DIAG is managed by the following signals: MSC_BIST_ENABLE, a signal from μC for test enabling; MSC_BIST_TRIGGER, a signal from μC that triggers the performance of DIAG; MSC_BIST_END, a signal from TC that indicates the end of the performance of DIAG to μC; and MSC_PASS_FAIL, a result of the performance of DIAG.

MON is designed to re-perform a group of well-defined tests performed by DIAG in order to verify the proper performance of F as well as the proper performance of DIAG.

If MON detects a test failure of F or a mismatch between a result of a test reported by DIAG and a result of a test reported by MON, then MON triggers a safe reaction, which may include de-energizing safety-related loads, as will be described in greater detail below in connection with the description of FIG. 4. Moreover, in addition to monitoring the U-Chip and the operability of DIAG, MON is designed to monitor other safe-related integrated circuits, as will be described in greater detail below in connection with the description of FIG. 4.

As noted above, one of the elements that ensures proper performance of the functional architecture of the invention is that μC of the ECU is exempt from functional interferences resulting from failures in the performance of DIAG or F. A well-known cause which may compromise this absence of functional interference is the presence of an overvoltage propagating from U-Chip to μC which is designated to the performance of MON.

Figure 4:
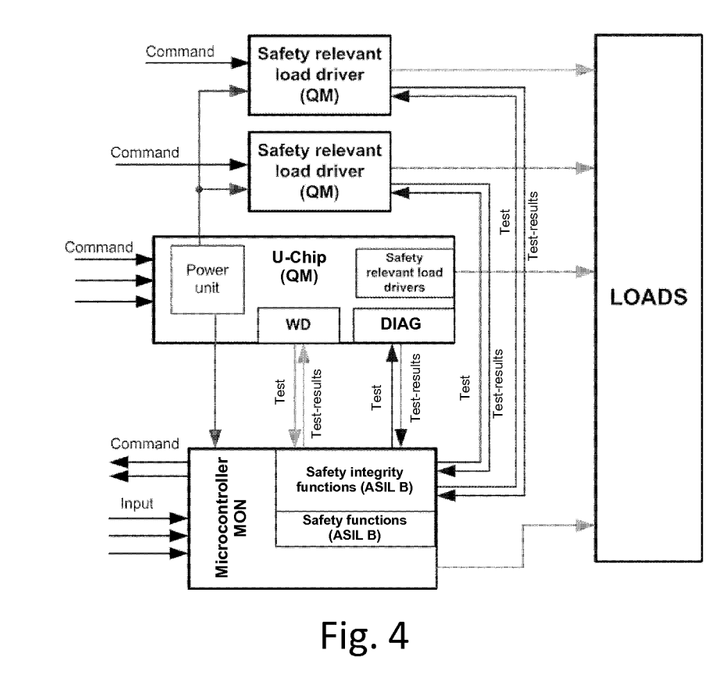
FIG. 4 shows a block diagram of safety architecture of an automotive internal combustion engine electronic control unit.

FIG. 4 shows a block diagram of safety architecture of the ECU which allows this propagation to be mitigated while protecting part of the safety-related loads. It is worth noting that U-Chip is provided with its own embedded safety-related load drivers, through which it drives given safety-related loads, hereinafter indicated by G2, while μC is not provided with its own embedded safety-related load drivers, but controls external safety-related load drivers of ECU, through which it drives other safety-related loads, hereinafter indicated by G1.

The external load drivers controlled by μC are provided with respective embedded Over/Under Voltage Monitors (O/U VM) designed to detect presence of an overvoltage propagating from μC towards the loads G1 and to responsively generate a de-energization command for the loads G1, thus causing the de-energizing thereof and protecting them from any damage due to overvoltage.

Furthermore, as is worth noting, the load drivers controlled by μC, like μC itself, are powered by the power supplies of U-Chip, which are therefore shared by U-Chip, μC and the external load drivers controlled by μC. Thus, a possible overvoltage generated within U-Chip and propagating into μC may compromise the functionality of MON, in addition to the loads G2 driven by U-Chip.

Figure 5:
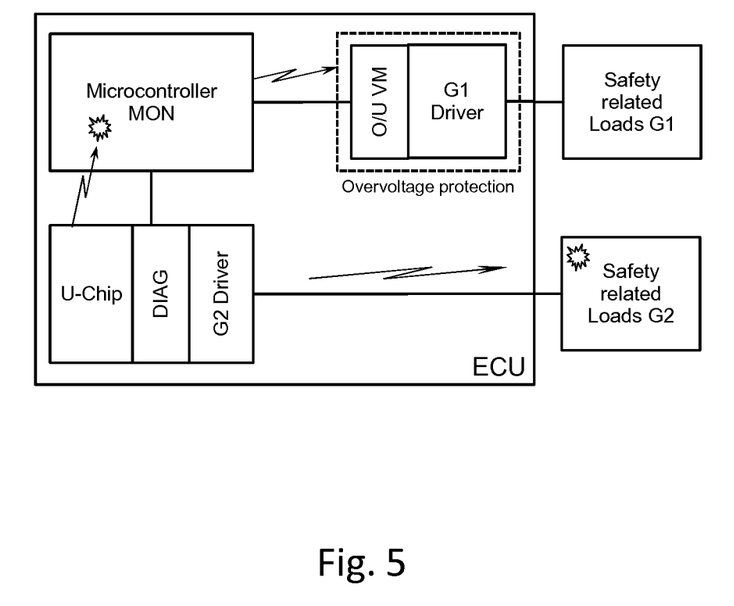
FIG. 5 shows a block diagram illustrating how an overvoltage may propagate within the automotive internal combustion engine electronic control unit of FIG. 4.

As shown in FIG. 5, due to the implementation of external load drivers provided with embedded over/under voltage monitors, a possible overvoltage generated in U-Chip and propagated to μC and, therefrom to the loads G1, or generated directly in μC and propagated to the loads G1, is detected by the embedded over/under voltage monitors, which responsively trigger a safe reaction including the generation of a de-energization command for the loads G1, thus causing the de-energization thereof and protecting them from possible damage due to overvoltage.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. An automotive internal combustion engine electronic control unit for performing safety-related functions with a predetermined automotive safety integrity level, the electronic control unit comprising: a microcontroller and an integrated circuit distinct from and communicating with the microcontroller; wherein the microcontroller is designed to perform one or more safety-related functions with an automotive safety integrity level that is the same as is required to the automotive electronic control unit; wherein the integrated circuit is designed to perform one or more safety-related functions with an automotive safety integrity level that is lower than that of the microcontroller; wherein the integrated circuit is further designed to perform, for each performed safety-related function, a corresponding diagnosis function designed to detect failures in the performance of the safety-related function; and wherein the microcontroller is designed to perform, for each performed diagnosis function, a corresponding monitoring function designed to monitor the performance of the corresponding diagnosis function by the integrated circuit to detect failures that may compromise the diagnostic capability of the diagnosis function.

2. The automotive internal combustion engine electronic control unit as set forth in claim 1, wherein the monitoring function is designed to re-perform tests performed by the diagnosis function to check proper performance of both the safety-related function and the diagnosis function; and wherein the monitoring function is further designed to trigger a safe reaction when either a test failure of the safety-related function or a mismatch between a test result reported by the diagnosis function and a test result reported by the monitoring function is detected.

3. The automotive internal combustion engine electronic control unit as set forth in claim 2, wherein the safe reaction triggered by the monitoring function includes de-energizing automotive safety-related loads.

4. The automotive internal combustion engine electronic control unit as set forth in claim 1, wherein the automotive safety integrity level of performance of safety-related functions required to the automotive electronic control unit is ASIL B, while the automotive safety integrity level of performance of safety-related functions required to the integrated circuit is ASIL QM.

5. The automotive internal combustion engine electronic control unit as set forth in claim 1, wherein the safety-related functions include one or more of:
   intelligent functions including
   smart crank management,
   intelligent watchdog,
   flying wheel interface,
   wake-up and power enable logic;
   power supplies including
   ECU power supplies
   sensor power supplies;
   communication interfaces including
   MSC (Micro Second Channel) interface,
   LIN (Local Interconnect Network) transceiver,
   CAN (Controller Area Network) transceiver; or
   load driving channels.

6. The automotive internal combustion engine electronic control unit as set forth in claim 1, wherein the integrated circuit includes:
   a Test Controller designed to enable and synchronize the performance of the diagnosis function;
   a Circuit Under Test which implements the safety-related function to be tested;
   a Test Pattern Generator designed to test correct operation of the Circuit Under Test;
   an Output Response Analyzer designed to compare an output of the Circuit Under Test with an expected output and provide an indication of test success or test failure;
   an Input Isolation Circuit designed to connect an input of the Circuit Under Test to the Test Pattern Generator when the diagnosis function must be performed; and
   an Output Isolation Circuit designed to connect an output of the Circuit Under Test to the Output Response Analyzer after the diagnosis function has been performed.

7. The automotive internal combustion engine electronic control unit as set forth in claim 1, wherein the integrated circuit further includes embedded safety-related load drivers through which the integrated circuit drives safety-related loads; wherein the microcontroller lacks embedded safety-related load drivers; wherein the automotive internal combustion engine electronic control unit further includes external safety-related load drivers separated from and controlled by the microcontroller through which the microcontroller drives different safety-related loads; and wherein the external safety-related load drivers include respective embedded Over/Under Voltage Monitors designed to detect overvoltage propagating from the microcontroller towards the respective safety-related loads and to responsively generate a de-energization command for the associated safety-related loads.

8. The automotive internal combustion engine electronic control unit as set forth in claim 1, wherein the integrated circuit further includes an electric power supply unit for powering the integrated circuit, the microcontroller, and the external safety-related load drivers.

9. An automotive internal combustion engine electronic control unit comprising: a microcontroller; an integrated circuit distinct from and communicating with the microcontroller including embedded safety-related load drivers through which the integrated circuit drives safety-related loads; and external safety-related load drivers separate from and controlled by the microcontroller through which the microcontroller drives different safety-related loads; and wherein the external safety-related load drivers include respective embedded Over/Under Voltage Monitors designed to detect overvoltage propagating from the microcontroller towards the respective safety-related loads and to responsively generate a de-energization command for the associated safety-related loads.

10. The automotive internal combustion engine electronic control unit as set forth in claim 9, wherein the integrated circuit further includes a power supply unit to power the integrated circuit, the microcontroller, and the external safety-related load drivers.

11. A motor vehicle including the automotive internal combustion engine electronic control unit as set forth in claim 1.

* * * * *

UNITED STATES PATENT AND TRADEMARK OFFICE
CERTIFICATE OF CORRECTION

PATENT NO. : 9,677,480 B2  
APPLICATION NO. : 14/446466  
DATED : June 13, 2017  
INVENTOR(S) : Piero Carbonaro et al.

Page 1 of 1

It is certified that error appears in the above-identified patent and that said Letters Patent is hereby corrected as shown below:

Delete:  
Item (73) "Assignee: Magneti Marelli S.p.A., Corbetta (IT)"

And insert therefor:  
Item (73) --Assignees: Magneti Marelli S.p.A., Corbetta (IT)  
Exida Development S.r.l., Colleretto Giacosa (IT)--.

Signed and Sealed this  
Twenty-fourth Day of July, 2018

Andrei Iancu  
*Director of the United States Patent and Trademark Office*